July 13, 1926.
J. J. HOFFMANN
1,592,211
COLLAPSIBLE MOLD FOR PRESSING MEATS AND OTHER FOOD PRODUCTS
Filed Dec. 24, 1925    2 Sheets-Sheet 1
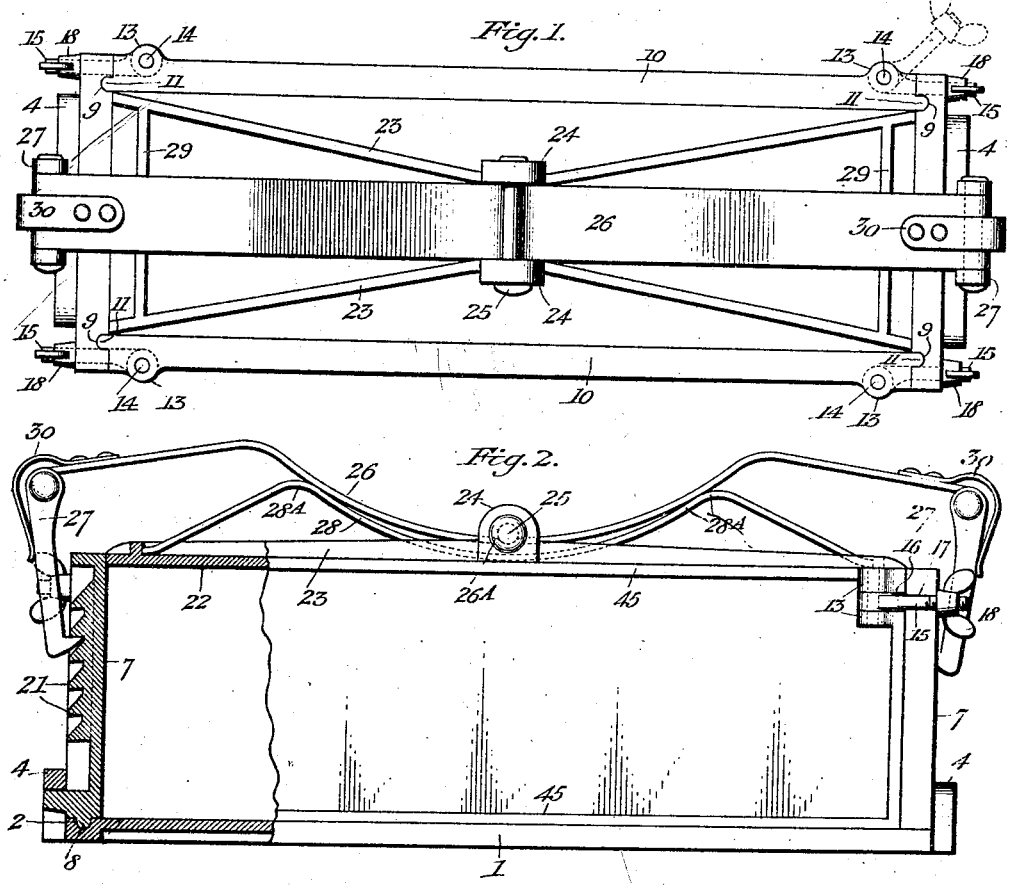
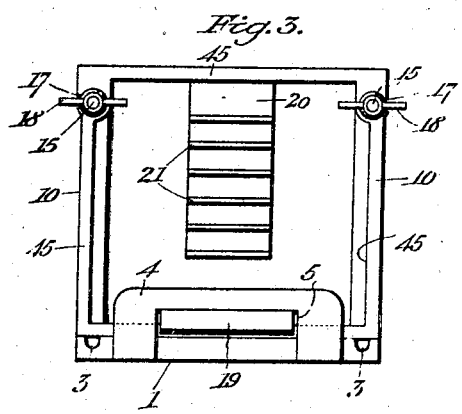
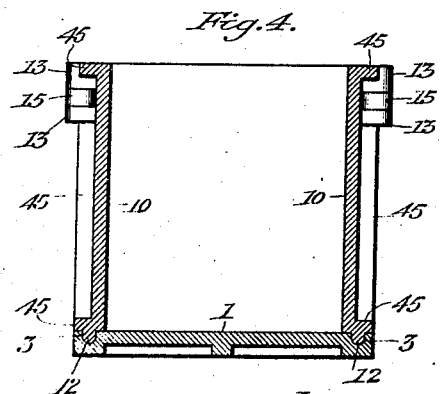
Inventor:
Joseph J. Hoffmann,
By H. S. Bailey Attorney

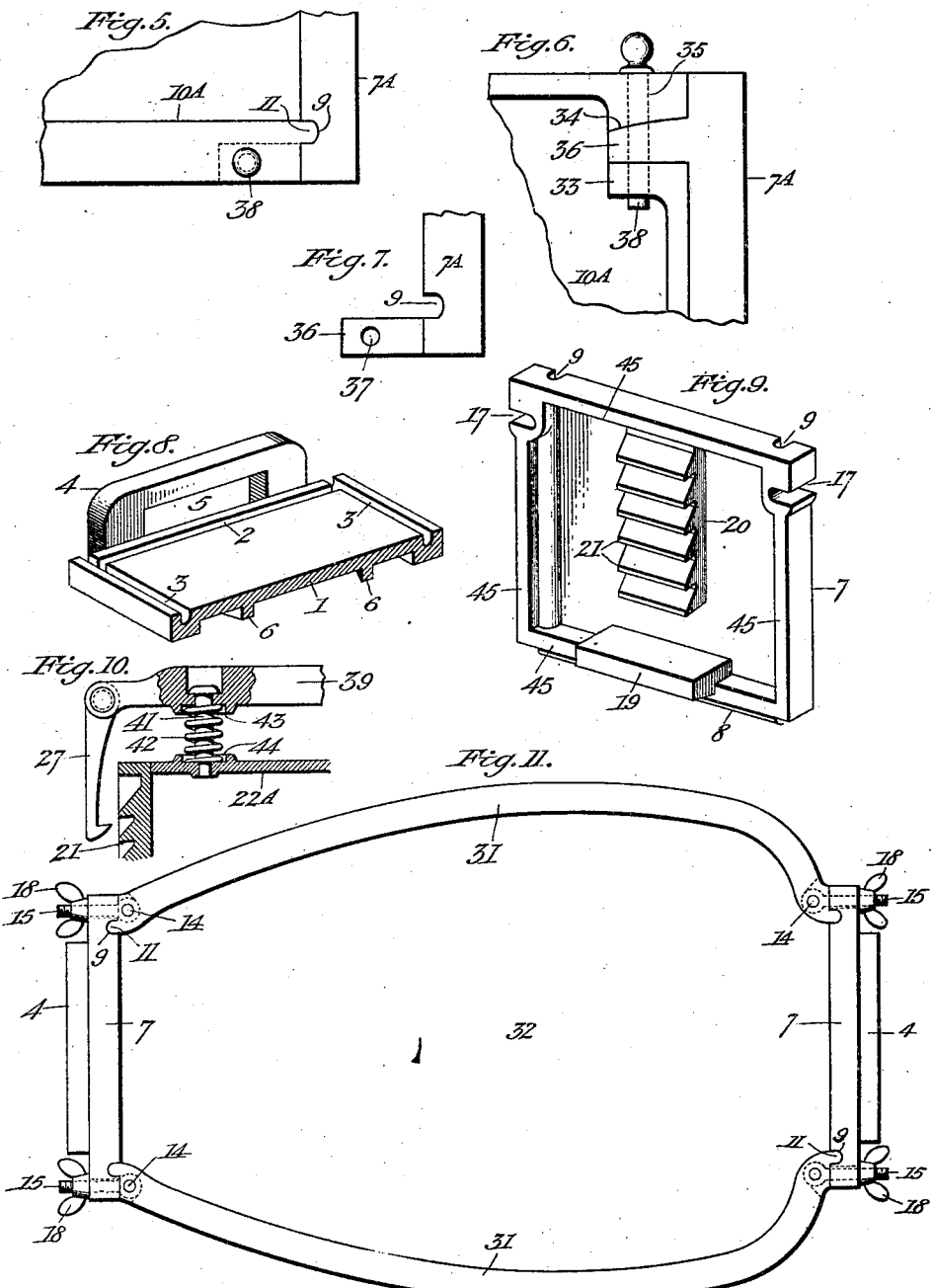

Patented July 13, 1926.

1,592,211

UNITED STATES PATENT OFFICE.

JOSEPH J. HOFFMANN, OF DENVER, COLORADO.

COLLAPSIBLE MOLD FOR PRESSING MEATS AND OTHER FOOD PRODUCTS.

Application filed December 24, 1925. Serial No. 77,517.

My invention relates to a collapsible mold of any practical shape, for forming various kinds of meat, prepared cereals, fruit gelatine and other foods into loaves or cakes.

And the objects of my invention are:—

First: to provide a collapsible mold that comprises interlocking side and end and bottom plates.

Second: to provide a collapsible mold of rectangular or any other shape in which various food substances can be molded into loaves and cakes; and in which a bottom plate and end and side members are made separately and independently of each other and in which the bottom plate is provided with looped members and with recesses so arranged that the ends and the sides interlockingly fit into each other.

Third: to provide a simple sanitary type of mold that is preferably of rectangular shape and has been especially designed for the pressing and molding of meats such as "pressed-ham" "head-cheese" "pigs-feet" "pressed corn beef" "pressed pork loin" "loin-loaf" "chili" "wet and prepared cereals, fruits and other gelatine foods, cheese and for molding cakes and other substances and materials" that it is desired to mold or press into loaf forms and into the form of cakes ready to be prepared for shipment and to sell directly to consumers.

I attain these objects by the mechanism illustrated in the accompanying drawings, in which:—

Fig. 1, is a plan view of the improved collapsible mold.

Fig. 2, is a side elevation of the same, one of the ends thereof being shown in section.

Fig. 3, is an end view thereof, the presser plate being omitted.

Fig. 4, is a transverse sectional view through the mold, omitting the presser plate.

Fig. 5, is a fragmental plan view of one corner of the mold, showing a modification in the manner of securing the ends and sides together.

Fig. 6, is a side view of the construction shown in Fig. 5.

Fig. 7, is a fragmental plan view of one corner of the end plate shown in Figures 5 and 6.

Fig. 8, is a perspective view of one end portion of the bottom or base plate.

Fig. 9, is a perspective view of one of the end plates.

Fig. 10, is a fragmental sectional view illustrating a modification in the manner of holding the presser plate under spring pressure, and Fig. 11, is a plan view of a mold adapted for pressing whole hams.

Referring to the drawings, embodying my invention, the numeral 1, designates the base plate of the improved meat and other food pressing mold, and along the opposite ends and side edges of this bottom plate are formed grooves or recesses 2 and 3 and the bottoms of which are rounded to allow them to be thoroughly and quickly cleaned. The side grooves 3 extend throughout the entire length of the bottom plate but the end grooves 2 intersect the side grooves, but do not extend across them to the outside edges of the opposite sides of the bottom plate.

Upon the opposite ends of the bottom plate are formed inverted U-shaped keepers 4 which are beyond the end grooves 2 and project above the top surface of the plate and the tops and sides of these keepers 4 form rectangular openings 5, the bottom plate 1 is provided on its under side with diagonal strengthening ribs 6, which extend from corner to corner, and intersect each other at the center of the plate.

The lower edges of the two opposite end plates 7 are formed with longitudinal tongues or ribs 8 which fit loosely in the grooves 2, of the base plate and the side edges of the end plates are provided with vertical grooves 9. The opposite ends of the side plates 10 are provided with vertical tongues 11, which fit loosely into the grooves 9 of the end plates.

The lower edges of the side plates 10, are formed with longitudinal tongues 12, which are adapted to fit into the longitudinal grooves 13 which extend along the side edges of the bottom plate.

The upper corner portion of each side plate is formed with spaced lugs or ears 13, having alined holes in which pins 14 are passed, which also pass through eye bolts 15, which are thus held between the ears 13 so as to swing on the pins. The space between the ears 13 form grooves or recesses 16, which extend out through the adjacent ends of the plate and the grooves 16 are adapted to register with grooves or recesses 17, which are formed in the side edges of the end plate 7, and in order to lock the end and side plates together, the eye bolts 15 are swung into the grooves 17 of the end plate, and thumb nuts 18 are screwed upon the eye bolts and against the end plates, as shown in Figures 1 and 2.

Upon the outside face of each end plate, and at the lower edge thereof, is formed a lug 19, which is of a size to fit simply in the opening 5 of the keeper 4 on the end of the bottom plate, and thus lock the end plates to the bottom plate, and when the side plates are locked to the end plates by the eye bolts in the manner above described, all of the parts are securely held together in mold form.

When thus assembled, the heads 12 on the lower edges of the side plates, which fit in the grooves 3 of the bottom plate, and the heads 11 on the ends of the side plates which fit in the grooves 9 of the end plates, prevent spreading of the side plates, and the end plates are held against movement by the thumb nuts 18.

A presser plate is used in connection with the mold and is adapted to be connected with the end plates in the following manner: The outside surface of each end plate is provided with an integral raised portion 20, which is formed with horizontally disposed under-cut teeth 21, as clearly shown in Fig. 9. The presser plate 22 is a metal plate of a size and shape corresponding to the interior of the mold and upon its upper side are formed diagonally disposed ribs 23 which terminate at the center of the plate, in spaced aperture lugs 24, through which a pin or bolt 25 is passed.

A spring 26 passes under the bolt 25 and the main portion of this spring is upwardly bowed as shown in Fig. 2, and bowed portion terminates in straight end portions to the extremities of which depending hooks 27 are pivotally secured. The bowed portion of the spring is formed with a central crimp 26^A in which the bolt 25 lies, the crimp preventing endwise movement of the spring.

A second spring 28, lies beneath the spring 26 and the bolt 25 and the main portion of this spring is also upwardly bowed and the bowed portion terminates in downwardly inclined end portions which abut against transverse ribs 29, near the ends of the presser plate and which connect the diagonal ribs 23. The opposite ends 28^A of the bowed portion of the spring 28, bears against the under side of the bowed portion of the spring 26, and provide fulcrum points for the spring 26. Upon the straight end portions of the spring 26 are riveted the inner ends of light springs 30 which are curved over the pivoted ends of the hooks 27 and then downwardly and inwardly so as to engage the said hooks and force them into engagement with any one of the teeth 21 on the end plates of the mold.

To form a pressed loaf from meat or other product, the raw material is cut into small pieces and placed in the mold; the presser plate 22 is then placed upon the material, and the end portions of the spring 26 are forcibly pressed down and each hook 27 engages one of the teeth 21 on the end plates 7 of the mold. The spring 26 is then under heavy tension which causes a downward pressure on the presser plate 22. The mold is then placed in water at the necessary temperature to cook the material and as the material softens under the cooking process, the presser plate is forced down by the spring 26, thus pressing the material into loaf form; and when the material has cooled, the parts of the mold are disconnected leaving the loaf free and in perfect form.

With the solid molds in present use, the loaf is often marred or broken, as it can only be removed from the mold by turing the same upside down and shaking it until the loaf drops out.

In Fig. 11 is shown a mold which is adapted for pressing a whole ham. This mold is in all respects similar to the mold shown in Figures 1 and 2, excepting that the side plates 31 and bottom plate 32 are outwardly curved, to conform somewhat to the shape of the ham, the end plates being identical with those in the figures referred to.

In Figures 5, 6 and 7 are illustrated a modification in the manner of securing the side and end plates of the mold together. In this arrangement, the upper corners of the side plates 10^A are formed on the outer side, with a raised portion 33, in which is formed a slot or recess 34, which opens out through the end of the plate and a vertical hole 35 extends down from the upper edge of the plate and through the raised portion 33, as to intersect the said slot or recess 34. The upper corners of the end plates 7^A are formed on the outer side with lugs 36 which are adapted to enter the recess 34 in the side plates, when the side and end plates are assembled. The lugs 36 are provided with holes 37 which register with the holes 35 in the side plates, and a pin 38, is inserted in the holes 35 and 37 and thus securely locks the end and side plates together. The upper edge of the lug 36, and the under edge of the recess 34, are curved in an arc whose center is the head 8 on the lower edge of the end plate, which is the axis on which the end plate swings, when connecting it with or disconnecting it from the side plate, as will be understood.

In Fig. 10, is shown a modification in the tension mechanism for the presser plate. In this arrangement a horizontal bar 39 takes the place of the spring 26 of Figures 1 and 2 the hooks 27 being pivotally attached to the opposite ends of the bar, counterbored holes 40 are formed in opposite ends of the bar, and bolts 41 are passed down through the holes, their heads resting on the bottoms of the counterbores.

The ends of these bolts are rigidly secured in holes in the presser plate 22ᴬ, and strong coil springs 42 surround the bolts and are interposed between the bar 39 and the presser plate 22ᴬ, the ends of the springs lying in shallow sockets 43 and 44, in the said bar and plate respectively.

In practice, the bar 39 is pressed down, thereby compressing the springs 42, and the hooks 27 are caused to engage the teeth 21 on the end plate, whereby the presser plate is forced against food products in the mold, as in the manner previously described. The presser plate is dispensed within molding gelatines, and when the mold is used for baking cakes or other articles not requiring pressure.

The molds are preferably made of aluminum though any other suitable material may be employed, and the outer faces of the side and end plates are formed with ribs 45 along their sides and end edges which not only strengthen the plates but give an ornamental appearance to the mold.

Having described my invention, what I claim as new and desire to secure by Letters Patent, is:—

1. In a collapsible mold, the combination with a bottom plate having keepers on its ends; of end plates having projecting lugs adapted to enter said keepers and lock the end plates to the bottom plate, side plates and means for connecting the end and side plates.

2. In a collapsible mold of the character described, the combination with a bottom plate having integral yoke-shaped keepers on its ends; of end plates having outwardly projecting lugs thereon adapted to enter said keepers and lock the end plates to the bottom plate, side plates and means for connecting the end and side plates.

In testimony whereof I affix my signature.

JOSEPH J. HOFFMANN.